June 25, 1963

J. A. MASON 3,095,071

BAND TYPE FRICTION COUPLING

Filed Jan. 14, 1960

INVENTOR
James A. Mason
By Wolfe, Hubbard, Voit & Osann
ATTORNEYS

June 25, 1963  
J. A. MASON  
3,095,071  
BAND TYPE FRICTION COUPLING  
Filed Jan. 14, 1960  
2 Sheets-Sheet 2
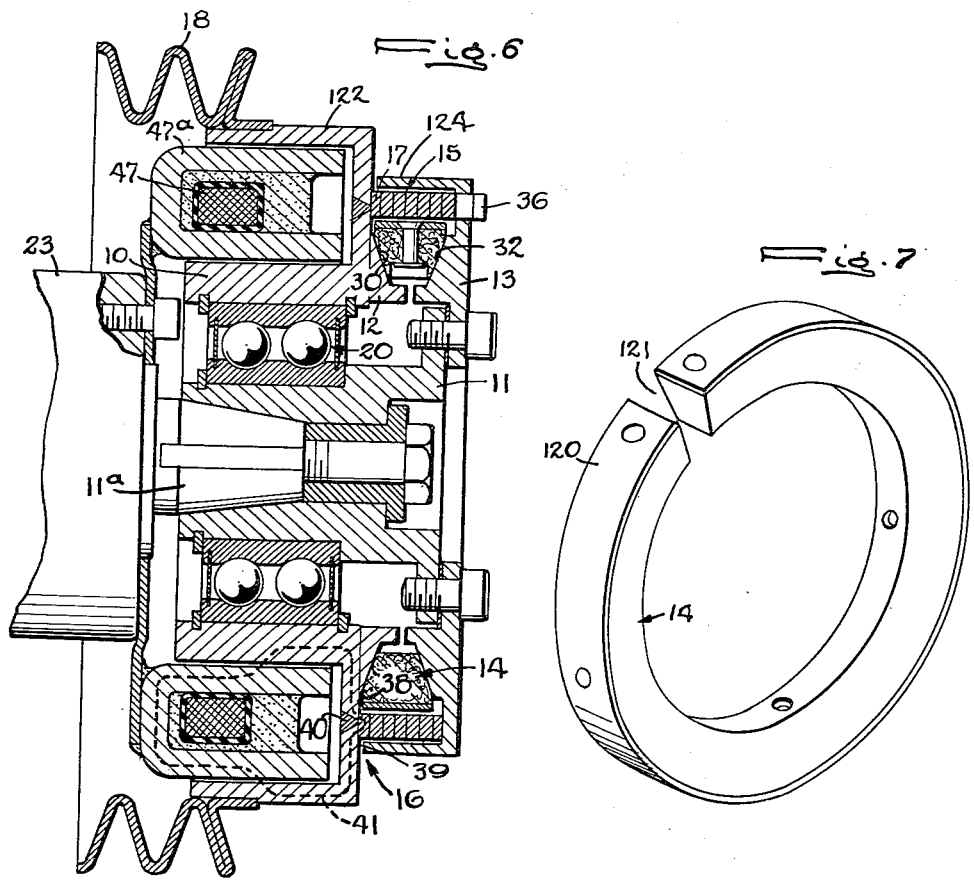
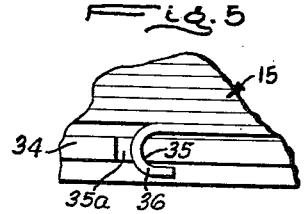

United States Patent Office 3,095,071
Patented June 25, 1963

3,095,071
BAND TYPE FRICTION COUPLING
James A. Mason, Beloit, Wis., assignor to Warner Electric Brake & Clutch Company, South Beloit, Ill., a corporation of Illinois
Filed Jan. 14, 1960, Ser. No. 2,364
2 Claims. (Cl. 192—81)

This invention relates to friction clutches and brakes of the type in which a flexible annular band is telescoped with a helical actuator coil and, by the winding or unwinding of the coil, is compressed into gripping engagement with driving and driven members to couple the same together frictionally.

The general object is to control the winding and unwinding of the actuator coil in a novel manner by a magnetic pilot clutch so arranged that the coil and band may be substantially coextensive with each.

A more detailed object is to utilize a free end turn of the actuator coil as the pilot clutch armature through a novel arrangement of the magnetic flux circuit of the pilot clutch.

Other objects and advantages of the invention will become apparent from the following detailed description taken in connection with the accompanying drawings, in which FIGURE 1 is a diametrical cross-sectional view of one form of friction clutch embodying the novel features of the invention.

FIG. 4 is a fragmentary development view of the end turn in one form of the actuator coil.

FIG. 5 is a fragmentary view of the turn and the anchor at the opposite end of the coil.

FIG. 6 is a view similar to FIG. 1 showing another and improved form of the invention.

FIG. 7 is a perspective view of the friction band of the clutch shown in FIG. 6.

Figure 1:
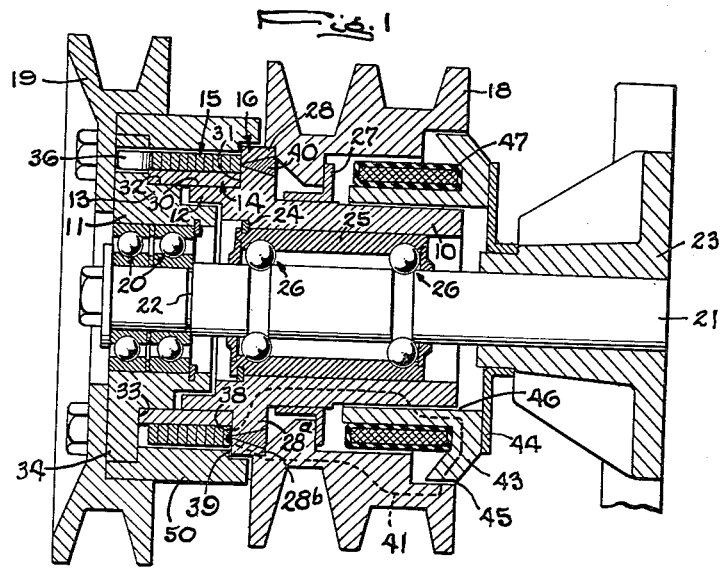

The improved torque-transmitting device may be employed as a clutch for coupling two rotatable members or shafts 10 and 11 together to transmit rotary power from one to the other or, by anchoring one of the members, the device may be used as a friction brake for exerting a retarding torque on a rotatable element. While various forms of the coupling are shown in the drawings to illustrate its versatility in construction and manner of use, I do not intend to limit the invention by such disclosures but aim to cover all modifications and alternative constructions and uses falling within the spirit and scope of the invention as expressed in the appended claims.

Generally stated, the improved coupling includes a peripheral surface on at least one of the relatively rotatable members 10 and 11 coacting with an annular friction band 14 anchoring on the other member and adapted to be pressed radially into gripping engagement with said surface by the winding or unwinding of a helical actuator coil 15 telescoping with the band. The torque for changing the diameter of the coil to derive the band compressing force is produced by an electrically controllable pilot friction clutch 16 having a driven member formed on or carried by one end turn 17 of the coil which remains disconnected from the band. As a consequence, virtually all of the working torque is transmitted from one of the friction members 10 and 11 to the other through the band 14, the actuator helix 15 carrying only the torque required to effect its winding or unwinding. The coupling is thus distinguished from so-called coil or spring clutches wherein the entire working torque is transmitted by the coil.

In the form shown in FIG. 1, the improved clutch is arranged to transmit rotary power from a belt driven pulley 18 on the shaft 10 to a driven pulley 19 bolted onto the outer end of the shaft 11. This shaft comprises a sleeve pressed onto the outer race rings of bearings 20 whose inner rings are fixed on the outer end of a non-rotatable shaft 21 having a shoulder 22 against which the rings are held by a washer clamped against the end of the stub shaft. The latter projects cantilever fashion from a stationary supporting bracket 23.

The shaft 10 comprises a sleeve pressed against a shoulder 24 and onto the outer race ring 25 of bearings 26 whose inner races are on the shaft 21. The pulley 18 is supported intermediate its ends by a non-magnetic ring 27 encircling and secured to the sleeve 10 which is formed near its outer end with a flange 28 supporting the end of the pulley.

The outer end portion of the sleeve 10 forms a driving drum 12 whose external cylindrical surface 30 extends to the end of the sleeve from the outer face 31 of the flange 28. The surface 30 is of substantially the same diameter as the cylindrical outer surface 32 of a drum 13 which is formed intermediate the ends of the sleeve 11 and terminates at a shoulder 33 on the inner side of a flange 34 at the outer end of the sleeve. To permit the bearings 20 to be located in the desired axial position, the inner end of the sleeve 11 is reduced in diameter and extended into the outer end of the sleeve 10.

Figure 2:
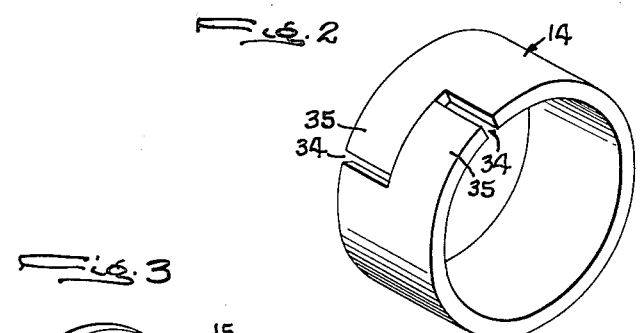
FIG. 2 is a perspective view of the friction band.
Figure 3:
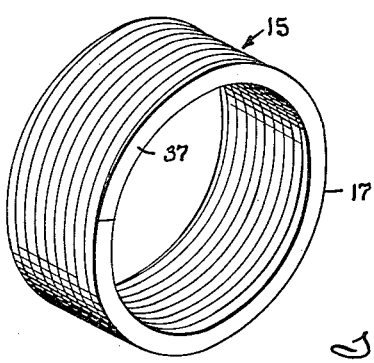
FIG. 3 is a perspective view of the helical coil for actuating the band.

In this form of the invention, the flexible band 14 for coupling the two drums 12 and 13 frictionally together overlaps both of the drum surfaces 30 and 32 and fits loosely in the groove defined by the flange walls 31 and 33. With the band thus disconnected from both of the drums 12 and 13, it is free to float circumferentially and requires no anchoring. In the form shown in FIG. 2, the band is a single flat strip covering the full circumference of the drums 12 and 13 except for gaps 34 which allow for proper contraction of the band around the drums throughout the service life of the band. To provide optimum contact area and insure proper alinement of the band ends, lugs 35 on these ends interlock with each other and lie in side contact as shown in FIG. 2.

The band, when in the form of a flat strip, is usually made about a quarter of an inch thick and of a material suited to the environment in which the clutch or brake is to be used. When the parts are to run in oil or other lubricant, a metal such as bronze and different from the drum surfaces will usually be employed. Where the parts remain dry, the torque output may be increased by employing a non-metallic reinforced asbestos type of friction material such as that ordinarily used for brake linings.

The band loosely encircling the drums as above described is compressed radially into gripping engagement with the full area of the drum surfaces 30, 32 by the flexible helix 15 which telescopes closely with the band over the full axial width thereof and is adapted to be wound up or unwound as the case may be in response to torque exerted between opposite ends of the coil, the diameter of the coil thus being changed in a direction to compress the entire area of the band against the two drum surfaces. While in certain instances it may be desirable to employ internal drum surfaces and an expansible band, it is frequently preferable to use a contracting band which, as shown in FIG. 1, is compressed against the external drum surfaces 30, 32 by winding up of the actuator coil.

Preferably the helical coil 15 is composed of resilient wire closely wound in a direction of the torque exerted by the pilot clutch 16 and with the adjacent convolutions lying substantially in side to side contact when the coil is free and thus unwound to a diaemter such as to release the contracting pressure on the band. Herein, the wire is composed of magnetic material such as ordinary spring steel, is of rectangular cross-section, for example 3/16 x 3/32 of an inch, and, for a purpose to appear later, has a radial width somewhat greater than the axial thickness. This coil thus presents a substantially continuous cylindrical internal surface which is substantially coextensive with the width of the band 14. Where the engagement of the coupling is effected by contraction of the band, sufficient clearance is allowed between the adjacent turns or between the coil ends and the flange surfaces 31, 33 to accommodate the axial expansion of the coil which accompanies the winding up of the latter incident to tightening the coil around the band when the latter is fully worn.

For most applications, it is usually desirable to anchor one end of the coil 15 to one or the other of the drums, the selection being determined by nature of the installation. In the clutch shown in FIG. 1, the anchor is on the driven drum 13 and comprises an abutment 35 defined by one wall of a hole 35a in the flange 34. One end 36 of the wire 15 is bent, preferably in a semi-circle as shown in FIG. 5 and hooked through the hole 35a which is large enough to provide proper clearance for shifting of the coil end as the band 14 wears away in service use.

The torque for initiating winding up of the actuator coil 15 is exerted on the opposite end of the band by the pilot clutch 16 which, in accordance with the present invention, includes an axially facing surface on the end turn of the coil and an opposed surface which surfaces are adapted to be brought into coupled relation by an electrically controlled operator effective in all positions of the opposed surfaces. In the couplings shown herein, the pilot clutch is of the magnetic friction type in which magnetic flux threading axially into and out of an end turn 17 pulls this turn axially into gripping engagement with the opposed clutch surface. The end turn 17, thus used as a magnetic armature, may be bent into an axial plane or tapered and flattened as shown in FIG. 4 in order to locate the major part of the end surface 37 in a plane substantially coinciding with the inner edge of the band 14.

The opposed and driving surface of the pilot clutch is formed on the axially fixed flange 28 which is formed on and rotates with the driving drum 12 and in this instance provides inner and outer pole rings 28a, 28b which terminate in faces 38 and 39 through which magnetic flux may thread into and out of the armature 17 along a path 41. While the latter may take other shapes, it is a toroid in the clutch shown in FIG. 1 due to the angular continuity of the pole faces 38, 39. The magnetic pole pieces 28a, 28b are joined together but separated from each other by a connector 40 of high reluctance which may be a filling of non-magnetic material brazed or otherwise suitably bonded to the pole pieces. By making the filling V-shaped as shown with the apex at the pole faces, leakage of flux between the pole pieces is minimized and a maximum area of the pole faces 38, 39 is exposed to the armature surface 37.

With the parts thus arranged, the flux circuit 41 extends axially through the sleeve 10 and hub of the pulley 18. In the form shown in FIG. 1, it is completed by a stationary core ring 43 of L-shaped cross-section secured to a non-magnetic flange 44 on the mounting bracket 23. The long leg of the core telescopes closely with the drive sleeve 10 while the end of the short leg is disposed close to the inner periphery of the pulley hub. The gaps 45 and 46 thus included in the flux circuit are of narrow radial width and of large area. The toroidal flux circuit thus formed encloses a multiple turn annular winding 47 which is secured to the stationary core 43.

When the winding 47 is deenergized, the spring coil 15 is disconnected from the magnet ring 28 and driving drum and remains expanded and of minimum length with its end turn 37 usually separated slightly from the pole faces 38, 39. No pressure is then exerted on the friction band 14 and the driving and driven drums 12, 13 remain uncoupled. To engage the clutch, the winding 47 is energized causing magnetic flux to thread the flux circuit 41 thus drawing the end turn 17 of the coil 15 into gripping engagement with the pole faces 38, 39. With this end of the coil free and disconnected from the band 14 and the other end anchored on the drum 13, the torque thus derived from the turning of the driving drum 12 initiates wiging up of the coil. The latter is thus contracted uniformly throughout its length so that its turns come into engagement with the band at substantially the same time and contract the full length of the latter against the two drum surfaces 30, 32 before any part of the band is subjected to any appreciable radial compression.

In accordance with known laws relating to wrapping effects, the torque applied to a helical element such as the coil 15 to wrap the same around a rigid surface after the initial contact with the latter decreases rapidly along the spring length and substantially disappears in about the third turn of the element. Thus, it would be expected that the torque delivered by the pilot clutch 16 would be incapable of compressing the band 14 against both of the surfaces 30, 32 with sufficient force to produce a coupling torque of appreciable magnitude. Such theory, although commonly accepted, does not apply in the present instance for reasons not yet fully understood. Instead, the part of the free floating band brought into contact with the driving drum 12 by the initial turns of the coil 15 under the pilot clutch action initiates an unexpected self-energizing action and the development of a supplemental friction torque exerted on the initial turns of the coil over the full area of engagement of such turns and the driving surface 30. Such torque effects a further winding up of the coil and contraction of the latter throughout its full length so as to compress the full width of the band not only against the driving surface 30 but also the driven surface 32 and under a surprisingly augmented pressure. Actually, this self-energizing action is so effective that the torque transmitted by the band from one drum to the other may be as much as one hundred times the input torque of the pilot clutch 16.

In spite of the surprising multiplication of the input torque, the engagement of the clutch remains under the complete control of the magnetic pilot clutch so that unwinding of the actuator coil 15 occurs immediately upon deenergization of the winding 47. Then, the coil 15, due to its resiliency, expands radially thus relieving the radial pressure on the band 14 which is free to expand by separation of its ends. Such unfailing release of the clutch is assured by virtue of the use of the end turn 17 itself as the armature of the pilot clutch and the freedom of the parts of this turn to move both radially and angularly relative to the pole faces 38, 39 and to the band 14. These relative movements result in quick dissipation of residual flux in the pole pieces and armature and effectual release of the pilot clutch.

The free circumferential floating of the actuated end of the coil 15 and its mechanical disconnection from the band 14 results in numerous other advantages. Thus, the clutch incorporates two independent and parallel systems for transmitting torque between the driving and driven elements 10 and 11. One of these which transmits substantially all of the torque comprises the two drums 12, 13 coupled by the band 14 which is free to adapt itself to the contour of the drums and the coil 15 in all positions of these parts. The second system is formed by the coil 15 which transmits only the torque developed by the pilot clutch 16 and the augmenting torque resulting from the self-energizing effect above described. The total of these actuating torques constitutes a small fraction of the total torque transmitted as a result of which the stressing of the coil is effectually minimized, and the latter may be made of wire of comparatively small cross section.

The provision of two independent systems for transmitting the main and pilot clutch torques between the driving and driven elements 10 and 11 contributes another and more important characteristic, namely the ability of the clutch to remain engaged during reversal of the load torque which occurs for example during part of the cycle of a gas compressor. This is because the release of the clutch necessitates an unwinding of the spring coil 15. Such unwinding, while the pilot clutch 16 remains energized and the band 14 contracted around the drums 12 and 13, can result only from a reversal of the load torque coupled to the driven drum and an increase in such torque to a value sufficient to cause slipping of the main clutch, that is, reverse turning of the driven drum then being gripped by the band 14. This means that unless the magnitude of the reversed load torque is substantial and approaches the torque previously transmitted through the main clutch, no such slippage can occur, and the clutch will remain engaged under the torque reversal.

It will be apparent from the foregoing that the width of the band 14 is substantially equal to the axial length of the actuator coil 15 so that the free end turn or armature 17 is held separated from the drum 12 while the pilot clutch is activated to engage the main clutch. This is made possible by the arrangement of the poles of the pilot clutch at the end of the coil 15 for threading of the magnetic flux axially through the armature turn 17. As a result, substantially all of the torque developed by the coupling except the pilot torque is transmitted through the band 14 thus minimizing the stressing of the coil wire. At the same time, the reluctance of the pilot clutch circuit remains substantially uniform at all times.

Overall axial compactness, greatly increased torque amplification, automatic wear compensation, and other advantages may be achieved by providing for wedging engagement between the band 14 and the surfaces of the driving and driven drums 12 and 13. Such a modification is shown in FIGS. 6 and 7 wherein the parts corresponding to FIG. 1, although somewhat different in configuration, are indicated by the same reference numerals. As before, the shaft 10 carrying the driving drum 12 and the poles 38, 39 of the pilot clutch 16 are adapted to be driven by V-belts running in grooves in the pulley 18 but the driven drum 13 is bolted to a flange on the driven sleeve 11 which is keyed onto a shaft 11ª.

To achieve the desired wedging engagement between the band and the surfaces 30, 32 on the drums 12 and 13, these surfaces, instead of being made cylindrical as in the couplings described above, are of conical contour and arranged on the shafts 10 and 11 to converge inwardly toward the clutch axis in the case of the contracting band type of clutch. These surfaces thus define between them an outwardly opening V-groove having an included angle which will vary according to the degree of wedging action desired, being about forty degrees in the present instance.

Of course, the cross-sectional shape of the band 14 complements that of the V-groove so that the converging side walls thereof lie substantially in full contact with the groove walls 30, 32 when the band is seated loosely in the groove. While the band may be composed of solid metal and divided into a plurality of arcuate segments, it is shown herein as comprising a single substantially complete annulus or ring of a suitable non-metallic friction material somewhat thicker than the depth of the V-groove so as to allow for ample wear in service use. For most installations, the friction material need not be covered because of the even distribution of the actuating force applied by the coil directly to the outer cylindrical surface of the band. If desired, this surface may be backed by and riveted to a thin strip 120 of metal which defines the exposed cylindrical surface for engagement with the actuator coil 15. The ends of the band are separated from each other by a gap 121 of sufficient circumferential length to permit of contraction of the band into the groove even after substantial wear has occurred.

The actuator coil 15 is of the same construction previously described being of an axial length corresponding to the width of the outer cylindrical surface of the band 14 and having a hooked end 36 anchored on a flange of the driven drum 13. As before, the turn at the opposite end of the coil coacts with the pole faces 38, 39 on the driving drum 12 to form the pilot clutch 16 for controlling the winding and unwinding of the coil in response to energization of winding 47 disposed within a stationary magnet core 47ª of U-shaped cross-section. The legs of the core telescope with the shaft 10 and a cylindrical hub 122 of the pulley 18 to form narrow radial air gaps in the toroidal flux circuit 41 which includes the pole faces 38, 39 formed in this instance on flanges of the hub and sleeve rigidly joined by the non-magnetic filling 40.

The overall operation of the actuator coil in contracting the band to engage the clutch or allowing the band to expand to release the clutch is the same as in the couplings previously described. The only difference is the wedging of the band in between the conical drum surfaces 30, 32. This results in numerous structural and operation advantages. For example, the full length of the band is confined laterally by the converging drum surfaces into which the band is wedged by the actuator coil. The band thus adjusts itself in the V-groove until the contracting force becomes distributed evenly over opposite sides of the band. Thus, the band surfaces wear away evenly, and uneven sizing of the drum surfaces or non-uniform wearing thereof are compensated for automatically in the wedging action. At the same time, the coning of the surfaces results in a substantial increase of the pressure between the band and the walls of the V-groove thereby correspondingly increasing the torque output of the clutch for a given contracting force exerted by the actuating coil. Also, for reasons not yet ascertained, the reverse torque which will be sustained before release of the clutch is substantially greater than in the clutches first described. The static torque developed when the pilot clutch is energized with the parts at rest is substantially equal to the dynamic torque developed with the same energization of the pilot clutch while the parts are rotating.

The radial wedging of the band 14 into the V-groove between the conical surfaces 30, 32 does urge the drums apart axially but the increased thrusts are easily sustained by proper construction of the bearings 20. The added bearing cost is more than offset by the numerous advantages above maintained together with the resulting decrease in the overall axial length of the coupling.

This application is a continuation-in-part of my copending application Serial No. 744,438 filed June 25, 1958, now abandoned.

This application discloses specific subject matter common to applicant's continuation-in-part application Serial No. 212,410, filed July 25, 1962.

I claim as my invention:

1. A friction coupling having, in combination, two members disposed end to end and mounted for relative turning about a common axis, annular friction surfaces on the respective members, one of said members being a driver, a free floating friction band extending around said surfaces for free turning relative thereto, said band being changeable in diameter to grip said surfaces frictionally and thereby transmit torque from the driving member to the other member, a multiple turn helical coil of magnetic material loosely telescoped with said band, means anchoring one end of said coil to one of said members, the turn at the other end of the coil being free and constituting a magnetic armature, a magnetic core carried by the other of said members and having axially facing pole faces disposed closely adjacent one side of said band and opposing said armature to form a flux path extending axially into and out of the armature, means for creating magnetic flux threading said path to draw said armature and pole faces into gripping engagement and thereby derive a pilot torque for varying the diameter of said coil in a direction to press said band against said surfaces, one side of said band extending axially into the plane of said end turn and telescoping with the latter so as to be engaged by such turn and hold the same separated at all times from the member beneath the band.

2. A friction coupling as defined in claim 1 in which said friction surfaces converge radially toward each other to define between them a groove of V-shaped cross-section, said band complementing the cross-section of said groove and having exposed peripheral surface substantially coextensive axially and telescoped with and engaged by said coil to compress the band radially into said groove.

References Cited in the file of this patent

UNITED STATES PATENTS

| | | |
|---|---|---|
| 863,639 | Powell | Aug. 20, 1907 |
| 1,182,589 | Schnuck | May 9, 1916 |
| 1,886,692 | Kapitza et al. | Nov. 8, 1932 |
| 1,910,319 | Brownlee | May 23, 1933 |
| 2,422,533 | Dodwell | June 17, 1947 |
| 2,566,539 | Starkey | Sept. 4, 1951 |
| 2,798,581 | Supitilov | July 9, 1957 |

FOREIGN PATENTS

| | | |
|---|---|---|
| 85,862 | Germany | Oct. 10, 1921 |
| 371,314 | Germany | Mar. 13, 1923 |
| 903,033 | France | Sept. 21, 1945 |